United States Patent
Schimmels et al.

(10) Patent No.: US 11,192,266 B2
(45) Date of Patent: Dec. 7, 2021

(54) VARIABLE STIFFNESS SERIES ELASTIC ACTUATOR

(71) Applicant: Marquette University, Milwaukee, WI (US)

(72) Inventors: Joseph M. Schimmels, Milwaukee, WI (US); Andrew Bernhard, Milwaukee, WI (US); Jacob Rice, Milwaukee, WI (US)

(73) Assignee: Marquette University, Milwaukee, WI (US)

( * ) Notice: Subject to any disclaimer, the term of this patent is extended or adjusted under 35 U.S.C. 154(b) by 250 days.

(21) Appl. No.: 16/092,661

(22) PCT Filed: Apr. 14, 2017

(86) PCT No.: PCT/US2017/027575
§ 371 (c)(1),
(2) Date: Oct. 10, 2018

(87) PCT Pub. No.: WO2017/180968
PCT Pub. Date: Oct. 19, 2017

(65) Prior Publication Data
US 2019/0126498 A1     May 2, 2019

Related U.S. Application Data

(60) Provisional application No. 62/322,550, filed on Apr. 14, 2016.

(51) Int. Cl.
*B25J 19/06* (2006.01)
*B25J 17/00* (2006.01)
(Continued)

(52) U.S. Cl.
CPC .......... *B25J 19/068* (2013.01); *B25J 9/1005* (2013.01); *B25J 9/126* (2013.01); *B25J 17/00* (2013.01);
(Continued)

(58) Field of Classification Search
CPC ........ B25J 9/068; B25J 9/126; B25J 17/0208; B25J 17/0216; B25J 17/0225;
(Continued)

(56) References Cited

U.S. PATENT DOCUMENTS 3,839,883 A    10/1974 Braess
4,432,739 A    2/1984 Walter
(Continued)

FOREIGN PATENT DOCUMENTS

CN    1253898 A    5/2000
CN    104424962 A    3/2015
(Continued)

OTHER PUBLICATIONS

Supplemental European Search Report for EP17783201, dated Jan. 8, 2020.
(Continued)

*Primary Examiner* — Jake Cook
*Assistant Examiner* — Gregory Robert Weber
(74) *Attorney, Agent, or Firm* — Andrus Intellectual Property Law, LLP

(57) ABSTRACT

A variable stiffness actuator comprises a flexure plate which comprises a first cantilevered beam that extends inwards from an outer periphery of the flexure plate. A housing and the flexure plate rotatable about a common joint axis. A first contactor is pivotably secured at a revolute joint to the housing. The first contactor rotates about the revolute joint at a first rotation axis. The first rotation axis offset on the housing from the joint axis. The first contactor engages the (Continued)

first cantilevered beam at a variable angle about the rotation axis to adjust a stiffness of a mechanical connection between the flexure plate and the housing.

20 Claims, 6 Drawing Sheets

(51) Int. Cl.
*B25J 17/02* (2006.01)
*B25J 9/10* (2006.01)
*B25J 9/12* (2006.01)
*F16F 1/22* (2006.01)
*F16H 49/00* (2006.01)

(52) U.S. Cl.
CPC ............ *B25J 17/0241* (2013.01); *F16F 1/22* (2013.01); *F16H 49/001* (2013.01)

(58) Field of Classification Search
CPC ............... B25J 17/0233; B25J 19/1005; B25J 19/0091; B25J 19/063; F16F 1/22; F16H 49/001

See application file for complete search history.

(56) References Cited

U.S. PATENT DOCUMENTS

| | | |
|---|---|---|
| 5,443,247 A | 8/1995 | Polites |
| 5,502,363 A | 3/1996 | Tasch et al. |
| 6,109,134 A * | 8/2000 | Sudau ............... F16F 15/13157 192/207 |
| 8,573,091 B2 * | 11/2013 | Chen ................... B25J 17/0208 74/490.05 |
| 9,227,328 B2 * | 1/2016 | Bicchi ........................ B25J 9/08 |
| 9,534,812 B2 * | 1/2017 | Furutani ................. F03G 6/064 |
| 9,676,104 B2 * | 6/2017 | Sutton, Jr. ................ F16D 3/56 |
| 10,016,331 B2 * | 7/2018 | Cestari Soto .......... B25J 9/1694 |
| 10,364,858 B2 * | 7/2019 | Knoll ................... B25J 17/0225 |
| 2010/0320658 A1 | 12/2010 | Mueller |
| 2012/0292839 A1 | 11/2012 | Smith |
| 2013/0079160 A1 * | 3/2013 | Brosowske ............... F16D 3/80 464/27 |
| 2015/0330458 A1 | 11/2015 | Sutton |
| 2016/0082603 A1 | 3/2016 | Schimmels |

FOREIGN PATENT DOCUMENTS

| | | | | |
|---|---|---|---|---|
| CN | 104647397 A | 5/2015 | | |
| CN | 104995088 A | 10/2015 | | |
| GB | 25725 A | 11/1912 | | |
| GB | 726635 B2 | 3/1955 | | |
| JP | 2011083884 A | 4/2011 | | |
| JP | 2014097548 A | 5/2014 | | |
| JP | 2016522366 A | 7/2016 | | |
| SU | 1773292 A3 | 10/1992 | | |
| WO | WO-2014176423 A1 * | 10/2014 | ............... | F16D 3/56 |
| WO | 2015102490 | 7/2015 | | |
| WO | WO-2017098471 A1 * | 6/2017 | ............... | F16D 3/78 |

OTHER PUBLICATIONS

International Search Report and Written Opinion in corresponding PCT Application No. PCT/US2017/027575 dated Aug. 17, 2017.
Office Action for Chinese Patent Application No. CN 201780037013.8, dated Jul. 2, 2019.
Office Action for Japanese Patent Application No. JP 2018-553192, dated Feb. 26, 2021.

* cited by examiner

VARIABLE STIFFNESS SERIES ELASTIC ACTUATOR

CROSS REFERENCE TO RELATED APPLICATION

This application is the U.S. national stage application of International Application PCT/US2017/027575, filed Apr. 14, 2017, which international application was published on Oct. 19, 2017, as International Publication WO2017/180968 in the English language. The international application is incorporated herein by reference, in entirety. The international application claims priority to U.S. Provisional Patent Application No. 62/322,550, filed on Apr. 14, 2016, the contents of which is hereby incorporated herein by reference in its entirety.

STATEMENT REGARDING GOVERNMENT SPONSORED RESEARCH OR DEVELOPMENT

This invention was made with government support under Grant No. IIS-1427329 awarded by the NSF as part of the National Robotics Initiative. The specific proposal funded: "NRI: Dexterous Manipulation Attained Using Task-Specific Admittance Realized with Variable Impedance Actuation", 2014-2017. The U.S. Government has certain rights in this invention.

BACKGROUND

Actuators are parts that convert stored energy into movement and in that way are like "muscles" of a robot. Current conventional robots use high stiffness actuators, or power joints, to provide absolute positioning accuracy in free space. For example, in traditional manufacturing operations where robots perform tedious and repetitious tasks in a controlled environment with great speed and precision, position controlled robots that stiffly follow predefined joint trajectories are optimal. Traditional position controlled actuators are designed from the premise that stiffer is better. This approach gives a high bandwidth system, but is prone to problems of contact instability, noise, and low power density.

Variable stiffness actuators provide many benefits in limiting interaction forces of robots in unstructured environments. In unstructured environments, where the exact position of objects in the environment are not known, force controlled joints or variable stiffness actuators are desirable because they allow a robot to comply with its surroundings. Such robots can execute dynamic activity in a changing and unpredictable environment, including, but not limited to humanoid robots, legged robots walking over rough terrain, robotic arms interacting with people, performance-enhancing exoskeletons, haptic interfaces, and other robotic applications.

Variable stiffness actuators provide benefits including shock tolerance, lower reflected inertia, more accurate and stable force control, extremely low impedance, low friction, less damage to the environment, and energy storage. Some examples of variable stiffness actuators are disclosed in the Applicant's co-pending U.S. patent application Ser. No. 14/786,881 entitled "Variable Stiffness Actuator with Large Range of Stiffness," the disclosure of which is incorporated herein by reference in its entirety.

BRIEF DISCLOSURE

An exemplary embodiment of a variable stiffness actuator includes a flexure plate. The flexure plate includes a first cantilevered beam that extends inwards from an outer periphery of the flexure plate. A housing and the flexure plate are rotatable about a common joint axis. A first contactor is pivotably secured at a revolute joint to the housing. The first contactor rotates about the revolute joint at a first rotation axis. The first rotation axis is offset on the housing from the joint axis. The first contactor engages the first cantilevered beam at a variable angle about the rotation axis to adjust a stiffness of a mechanical connection between the flexure plate and the housing.

An exemplary embodiment of a robotic manipulator includes a variable stiffness actuator. A flexure plate includes a first cantilevered beam that extends inwards from an outer periphery of the flexure plate. A housing and the flexure plate are rotatable about a common joint axis. A first contactor is pivotably secured at a revolute joint to the housing. The first contactor rotates about the revolute joint at a first rotation axis. The first rotation axis is offset on the housing from the joint axis. The first contactor engages the first cantilevered beam at a variable angle about the rotation axis to adjust a stiffness of a mechanical connection between the flexure plate and the housing. An input link is operably connected to the flexure plate. An output link is secured to the housing.

An exemplary embodiment of a method of controlling stiffness in an actuator joint includes providing an actuator joint. The actuator joint includes a flexure plate. The flexure plate includes a first cantilevered beam that extends inwards from an outer periphery of the flexure plate. A housing and the flexure plate are rotatable about a common joint axis. A first contactor is pivotably secured at a revolute joint to the housing. The first contactor rotates about the revolute joint at a first rotation axis. The first rotation axis is offset on the housing from the joint axis. An engagement between the first contactor and the first cantilevered beam is adjusted by adjusting a variable angle of the first contactor about the rotation axis. The first contactor engages the first cantilevered beam at a first angle of the first contactor to provide a first stiffness mechanical connection between the flexure plate and the housing. The first contactor engages the first cantilevered beam at a second angle of the first contactor to provide a second stiffness mechanical connection between the flexure plate and the housing.

DETAILED DESCRIPTION

The subject matter disclosed herein is described using several definitions, as set forth below and throughout the application.

Unless otherwise noted, the terms used herein are to be understood according to conventional usage by those of ordinary skill in the relevant art. In addition to the definitions of terms provided below, it is to be understood that as used in the specification, embodiments, and in the claims, the terms "a", "an", and "the" can mean one or more, depending upon the context in which the terms are used.

As used herein, "about," "approximately," "substantially," and "significantly" will be understood by persons of ordinary skill in the art and will vary to some extent on the context in which they are used. If there are uses of these terms which are not clear to persons of ordinary skill in the art given the context in which they are used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion of additional components other than the components recited in the claims. The term "consisting essentially of" should be interpreted to be partially closed and allowing the inclusion only of additional components that do not fundamentally alter the nature of the claimed subject matter.

Figure 1:
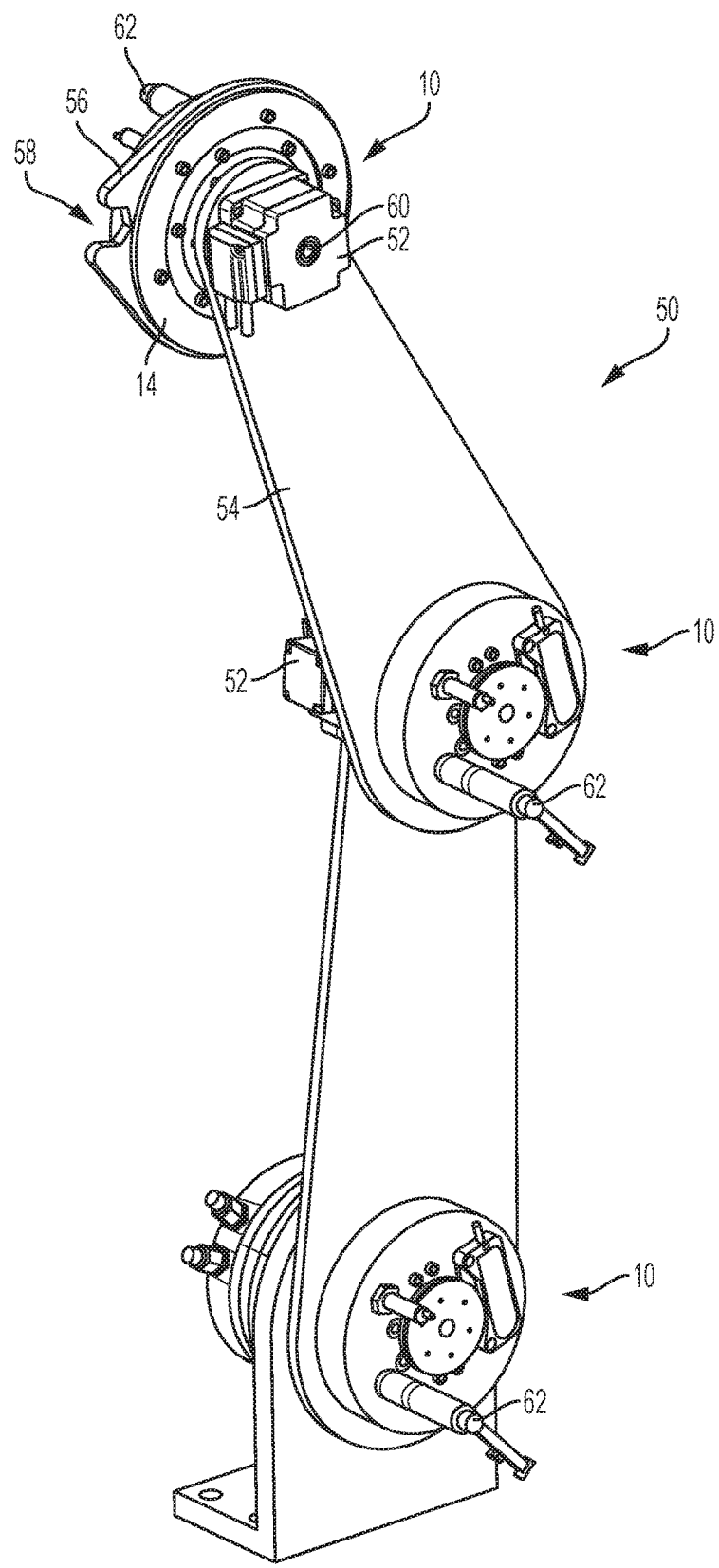
FIG. 1 depicts an exemplary embodiment of a robotic manipulator with a variable stiffness actuator.

FIG. 1 depicts an exemplary embodiment of a robotic manipulator 50 which exemplarily includes a variable stiffness actuator (VSA) 10 as will be described in further detail herein. Exemplary embodiments of the robotic manipulator 50 can interact with an environment that presents kinematic constraints that exemplarily are not or cannot be known to the robotic controller with complete certainty. Embodiments of the robotic manipulator 50 as disclosed herein use variable stiffness actuators 10 to enable the robotic manipulator 50 to comply with its environment when compliance is needed, but also to provide high stiffness in the actuator for precise motion control in unconstrained directions, including when the robotic manipulator is operating in free space.

The robotic manipulator 50 exemplarily includes an input link 54 and an output link 56 rotatably connected by the VSA 10. In an exemplary embodiment, the output link 56 may include a functional element 58, for example a wrench, screwdriver, or gripper element. A person of ordinary skill in the art will recognize other forms of functional elements 58 as may be used in further embodiments. It will further be recognized that in a multiple VSA embodiment of a robotic manipulator 50, each VSA 10 may perform a different functional task. In one embodiment, this may be exemplarily be performing each of a "shoulder", "elbow", or "wrist" function or other non-anthropomorphic functions. In embodiments, the control of the VSA 10, and for example the stiffness, range of stiffness, or other operation of each VSA 10 as described herein may be determined by the function carried out by the VSA 10.

Additionally, it will be recognized that in an embodiment of a robotic manipulator 50 that includes multiple VSAs 10, that an output link relative to one VSA 10 may comprise the input link 54 to a subsequent VSA 10. It will further be recognized that identification of output links and input links as used herein may be a matter of reference and therefore may be recognized by a person of ordinary skill in the art and that in other embodiments, input links and output links may be reversed.

The VSA 10 is further driven by a motor 52. In an exemplary embodiment, the motor 52 is a harmonic drive actuator, although a person of ordinary skill in the art will recognize other types of motors may be used in connection with a VSA 10. The motor 52 drives a shaft 60 which is connected to a flexure plate 18 (FIG. 2) of the VSA 10. In an exemplary embodiment, the shaft 60 is a hollow shaft secured to a periphery of the flexure plate 18. As will be described in further detail herein, the VSA 10 further includes a contactor motor 62. The contactor motor 62 is exemplarily a DC gear motor as described in further detail herein. The contactor motor 62 exemplarily drives the contactors as described herein to vary the stiffness of the joint in the VSA 10.

Figure 2:
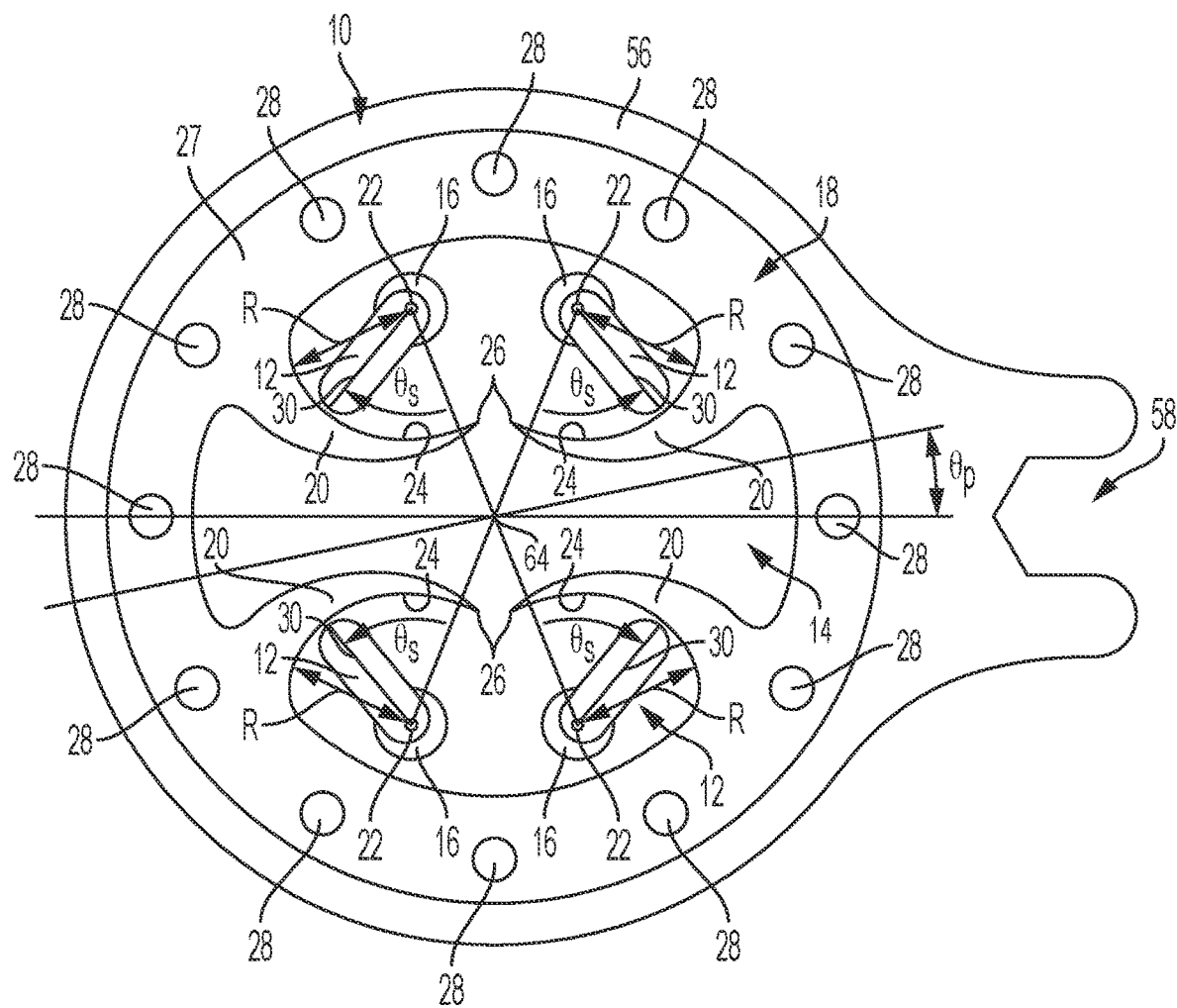
FIG. 2 depicts an exemplary embodiment of a variable stiffness actuator.

FIG. 2 is a detailed view of an exemplary embodiment of a VSA 10 as previously depicted in FIG. 1. While not depicted in FIG. 2, the shaft 60 is connected to the flexure plate 18. The output link 56 is secured to the housing 14. A plurality of contactors 12 are rotatably connected at revolute joints 16 to the housing 14. The contactors 12 respectively engage cantilevered beams 20 of the flexure plate 18. The flexure plate 18 includes an outer ring 27 that defines the outer periphery of the flexure plate 18. The cantilevered beams 20 extend inwardly from the outer periphery of the flexure plate towards the common VSA axis 64. The shaft 60 is connected to the outer periphery of the flexure plate 18 at the outer ring 27. Rotation of the shaft 60 rotates the flexure plate 18 and the rotation is transferred through the cantilevered beams 20 to the contactors 12, revolute joints 16, and housing 14. The shaft 60 is exemplarily hollow and secured to the flexure plate 18 at the periphery of the flexure plate 18. In an example, holes 28 in the periphery of the flexure plate 18 receive bolts (76, FIGS. 3 and 4) to secure the hollow shaft 60 to the flexure plate 18. The output link 56 is secured to the housing 14 and rotates with the housing 14. As described in further detail herein, engagement between the contactors 12 and cantilevered beams 20 of the flexure plate 18 selectively controls the stiffness of the rotative movement from the shaft 60 through the flexure plate 18 and contactors 12 to the housing 14 and the output link 56.

In robotics applications in which a robot interacts with its environment, e.g., manufacturing tasks, manipulation tasks involve physical interaction with the robot environment. Variable stiffness actuation as disclosed herein enables robots to provide high accuracy positioning in free space, like conventional manipulators, when joint stiffness is high. The variable stiffness of each joint also enables each joint to be adjusted independently so that robots will be able to have directions of high stiffness and directions of low stiffness to perform useful work without damage to the robot or to the work or surrounding environment.

An example of constrained manipulation would be to use a robot to tighten a bolt. The robot must be stiff in the direction associated with advancing the bolt in the threaded hole, but compliant in the directions that are constrained by the wrench/bolt interaction that do not advance the bolt in the hole.

Embodiments as disclosed herein will allow the robot to passively comply with task constraints to achieve reliable, high-speed manipulation.

Current commercially available series elastic actuators (SEAs) do not have variable stiffness. Several robots use SEA's. Commercial robots by Rethink Robotics (Baxter and Sawyer) have series elastic actuators. The NASA Robonaut has 2 arms, each having 7 joints, of which 4 joints in each arm contain series elastic actuators.

None of the currently available VSAs (found in research labs) have the range of stiffness obtained by embodiments as disclosed herein. The currently available VSA designs are theoretically capable of obtaining a ratio of highest passive stiffness to lowest passive stiffness of about 10. Embodiments of the designs as disclosed herein are theoretically capable of obtaining a ratio of well beyond this (theoretically the ratio is infinite because any finite number divided by zero (for small deflection) is infinite). For finite deflection in which contact between the contactor 12 and the cantilever beam 20 is maintained, the ratio may be about 10,000.

The benefit of the embodiments as disclosed herein relative to the use of series elastic actuators is that the passive stiffness of the actuator is selectable in real-time. This will enable robots to perform interactive tasks as described below.

As noted above, FIG. 2 depicts a detailed view of an exemplary embodiment of a variable stiffness actuator (VSA) 10, as may be used in connection with robotic manipulator 50. The VSA 10 exemplarily includes four contactors 12 which are each connected to a VSA housing 14 by revolute joints 16. Each revolute joint 16 defines a rotation axis 22 relative to the housing 14 about which a respective contactor 12 rotates. The contactors 12 make contact with a flexure plate 18 which is connected to the harmonic drive actuator 52 on the input link 54 by the shaft 60 (FIG. 1). The contactors 12 are thus rotatably controllable cams which are configured to engage the flexure 18 at selectively variable positions. The flexure plate 18 includes a plurality of non-linear cantilevered beams 20. One side of each cantilevered beam has a circular profile so that contact between the flexure plate 18 and contactor is maintained throughout the contactor range of motion. The other side of the cantilevered beam 20 has a profile that is designed to achieve an exponential increase in stiffness as the beam/contactor contact location moves toward the beam support (at the periphery of flexure plate 18). In embodiments, a corresponding number of contactors 12 and cantilevered beams 20 are provided in the VSA 10. Exemplarily, each of four contactors 12 make contact with the flexure plate 18 at four respective cantilevered beams 20. The cantilevered beams 20 extend inwardly towards a center point of the flexure plate 18. However, the cantilevered beams 20 embody a non-linear shape, arcing away from the center point 64 of the flexure plate 18 as the cantilevered beams 20 taper to an end point 26. As a result, an engagement surface 24 of a respective cantilevered beam 20 is exemplarily a radius distance R from a respective rotation axis 22. The rotation axes 22 are offset from the center of the flexure plate 18 and the cantilevered beams 20 exhibit the effect of curving away from the center of the flexure plate 18.

The orientations of the four contactors 12 (each contactor 12 at angle $\Theta_S$ relative to being directed to the VSA axis 64) determine the effective stiffness of the joint. The respective revolute joints 16 for each contactor 12 are exemplarily driven by at least one contactor motor 62 (FIG. 1). In an exemplary embodiment, the contactors 12 are driven about the revolute joints 16 by a single DC motor geared to simultaneously drive all of the contactors 12. In another embodiment, the rotational positions of the contactors 12 about the revolute joints 16 may be individually controlled by separate motors.

In an exemplary embodiment, the housing 14 is rotatable about a VSA axis 64 (coaxial with 60). The contactors 12 operate to rotate about the respective rotation axes 22 independent of the rotation of the housing 14, contactors 12, and revolute joints 16 about the VSA axis 64. The flexure plate 18 is driven to an angular position $\Theta_P$ about the VSA axis 64 by a drive motor 22 (FIG. 1). Rotation of the flexure plate 18 is transferred to the housing 14, and thus to the output link 56 secured to the housing 14. In this manner, when the VSA is very stiff (i.e., when the point of contact between the cantilever beam 20 and the contactor 12 is near the periphery), the output link 56 is also driven to the same angle $\Theta_P$.

It will be understood that in exemplary embodiments, the drive motor 22 may be sized for the particular joint and workload of each joint. The flexure plate 18 imparts torque to the driven length bending of the cantilever beams 20 of the flexure plate 18, giving the joint its overall elastic behavior. In an exemplary embodiment, an encoder (not depicted), exemplarily associated with the housing, measures joint elastic deflection within the VSA.

Available series elastic actuators (SEAs) incorporate a motor with a torsional spring connected in series to the driven component, usually a link in a robot or a prosthetic component. As described, a variable stiffness actuator (VSA), is similar to a SEA but the VSA in this embodiment has the additional capability of changing the stiffness of the actuator in real-time by controlling the location at which contactors 12 contact the cantilevered beam of the flexure plate.

Figure 3:
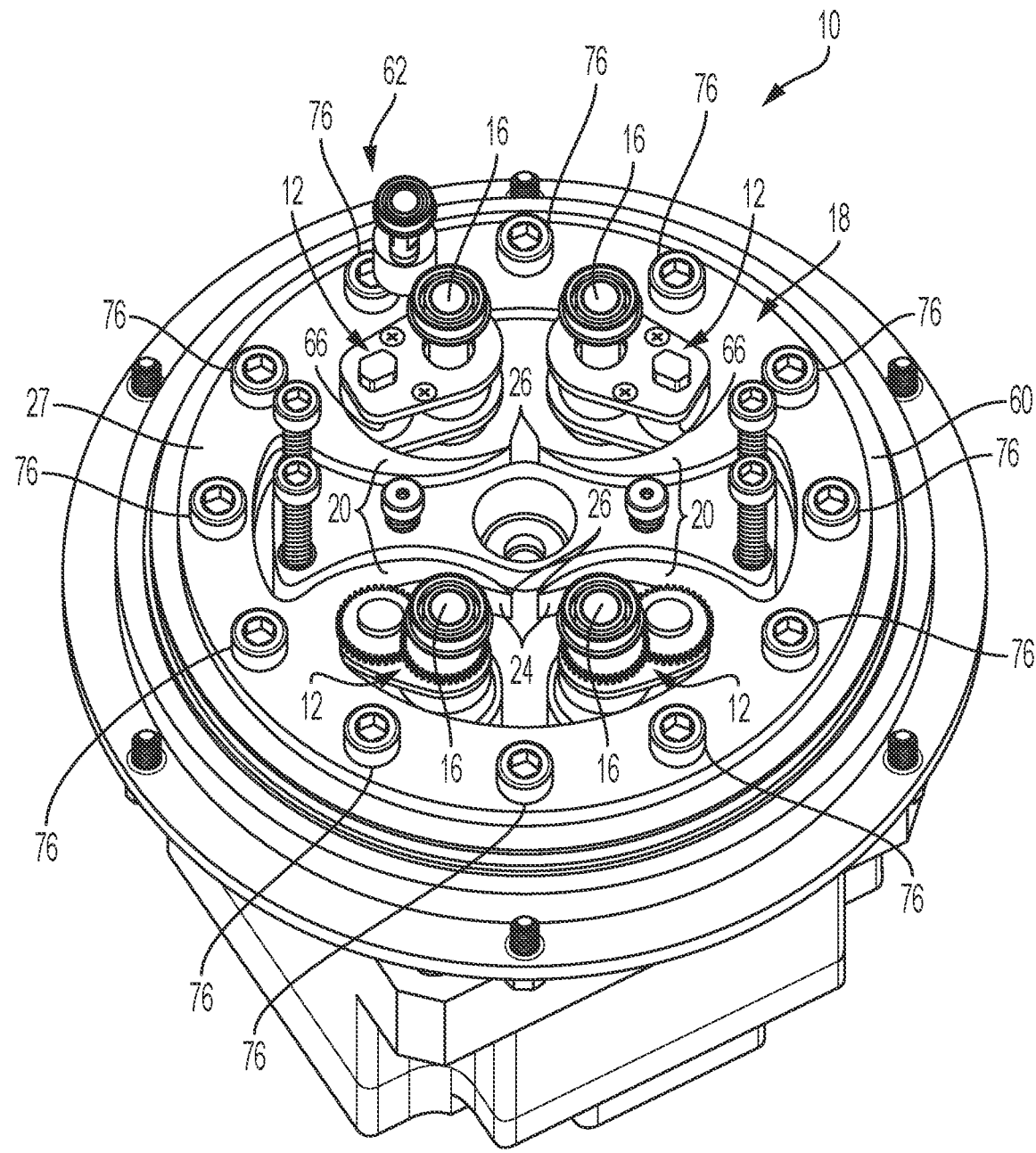
FIG. 3 depicts an exemplary embodiment of a variable stiffness actuator in a configuration for maximum stiffness.

Embodiments of the design presently disclosed differ from previous VSA designs in several areas. In this embodiment, the harmonic drive shaft is hollow. In this embodiment, the flexure plate 18 is driven at the shaft periphery rather than at the center of the flexure plate 18. In embodiments as disclosed herein stiffness is high when the contact points between the contactors 12 and the flexure plate 18 (e.g. cantilevered beams 20) are close to the periphery of the flexure plate 18, as depicted in FIG. 3. Stiffness is low when the contactors are directed toward the drive shaft center, as depicted in FIG. 4.

The cantilevered beam 20 of the flexure plate 18 cross-sectional area and the direction of constraining forces are designed to increase the range of effective stiffness selectable through operation of the VSA 10. The flexure plate 18 with cantilevered beams 20 is also designed in such a way that the actual stiffness will be close to the commanded stiffness despite uncertainties in the contactor location throughout the entire range of stiffness values.

The cantilevered beams 20 of the flexure plate 18 have a specific nonlinear cross section. The contactor-side cross section corresponds to a circular arc. By using a circular arc the contactor 12 does not translate along the beam to change the point of contact; rather, the contactor 12 is rotated about the respective rotation point 22 off the respective cantilevered beam 20 to change the point of contact on the contact surface 24 between the contactor 12 and the cantilevered beam 20. By using rotative movement of the contactor 12 to create rotative change of the contact point along the cantilevered beam 20 as opposed to translation or translative movement, movement of the contactor adjusts both an effective bending cross section of the cantilevered beam 20 and the direction of the constraining forces on the cantilevered beam 20. When the contactors 12 are directed toward the VSA axis 64, the forces imposed by the contactor 12 on the cantilevered beam 20 cannot prevent rotation about the VSA axis 64. When the contactors 12 are directed perpendicular to the direction toward the VSA axis, the contact forces directly oppose rotation about the VSA axis.

Figure 4:
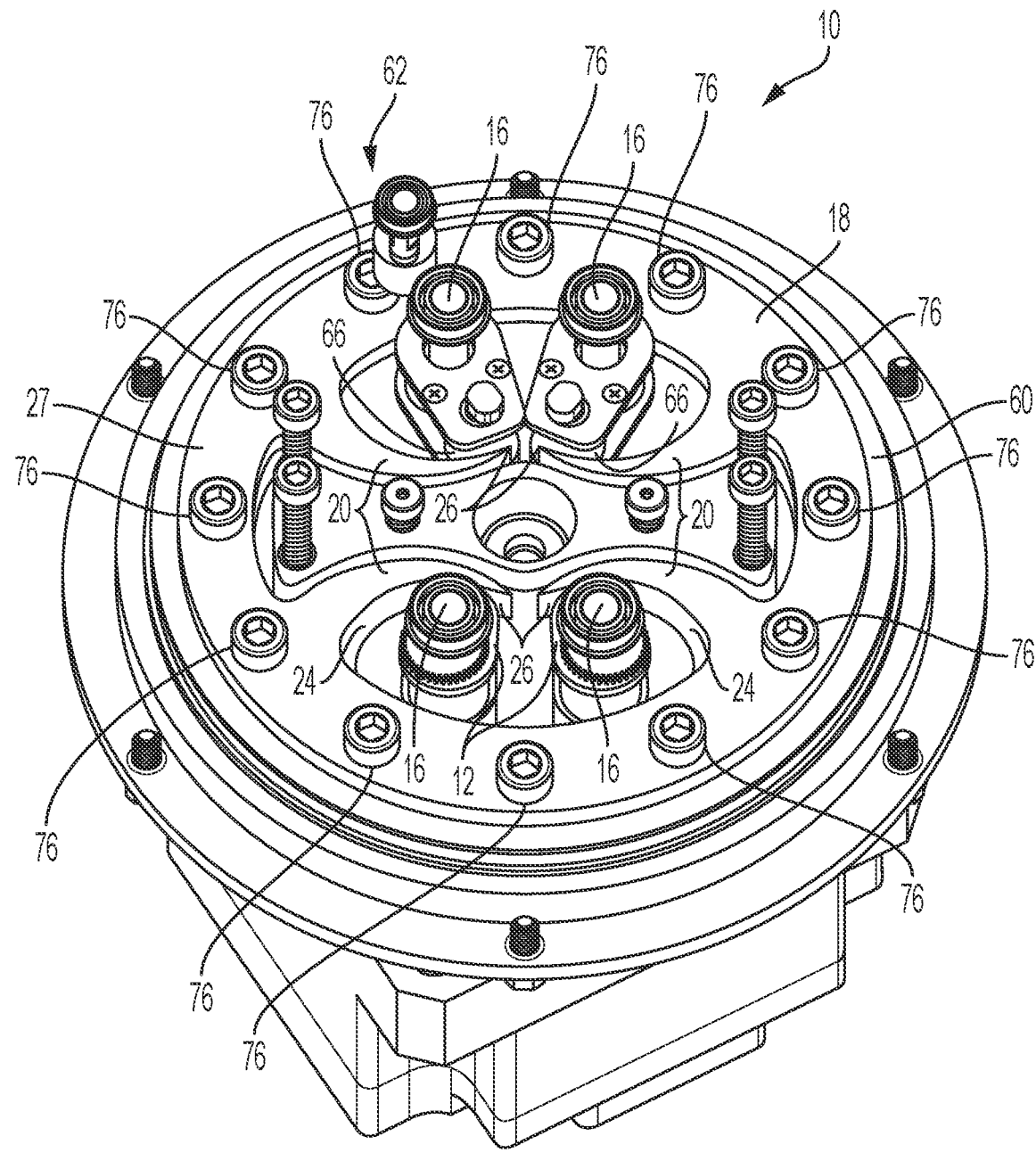
FIG. 4 depicts an exemplary embodiment of a variable stiffness actuator in a configuration for minimum stiffness.
Figure 5:
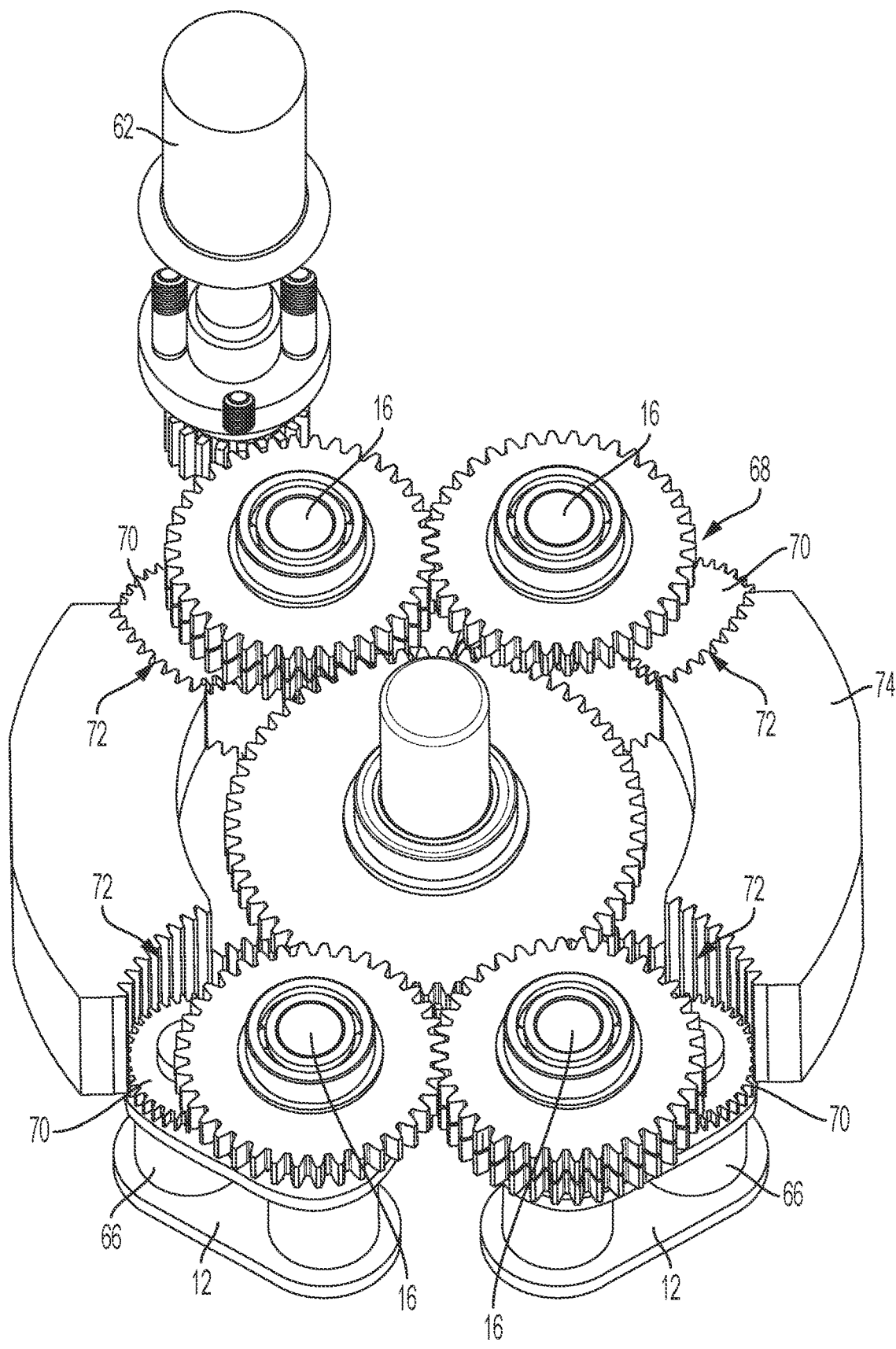
FIG. 5 depicts an exemplary embodiment of a gear train which may be used in connection with an embodiment of a variable stiffness actuator.
Figure 6:
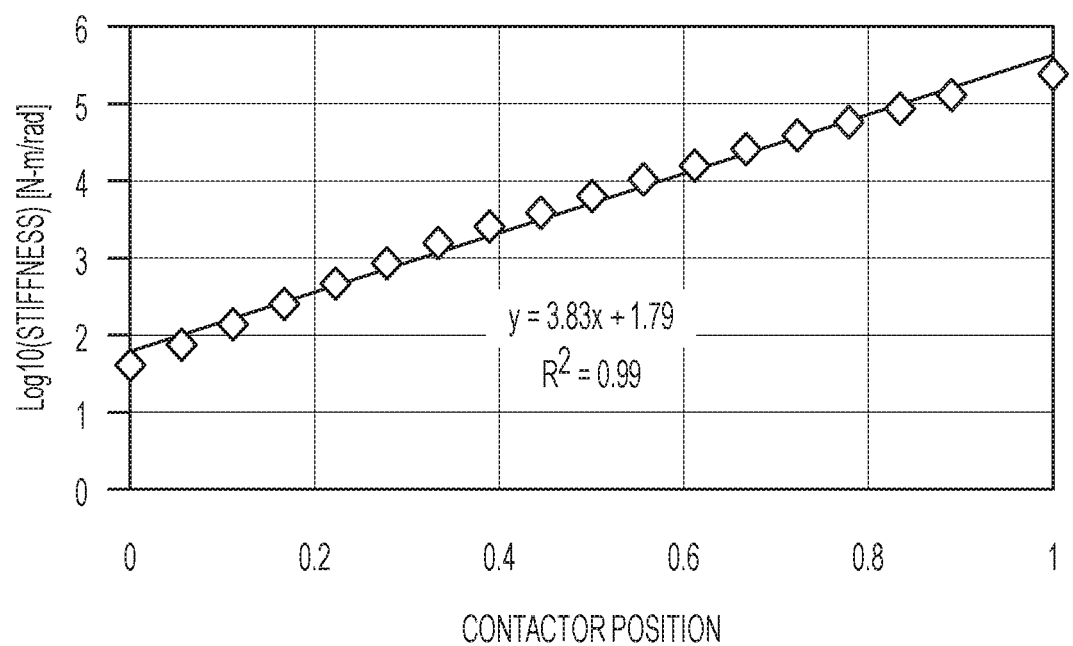
FIG. 6 is an exemplary graph of log joint stiffness at various normalized contactor angles $\Theta_S$.

FIGS. 3 and 4 depict an exemplary embodiment of a variable stiffness actuator exemplarily configured for maximum stiffness (FIG. 3) and minimum stiffness (FIG. 4). The joint stiffness is controlled by moving a set of contactors 12, exemplarily including rollers 66 along the arc of the cantilevered beams 20 of the flexure plate 18. In an exemplary embodiment, a single DC gear motor 62 is geared through a plurality of gears 68 to drive all exemplary four contactors 12 simultaneously as exemplarily shown in FIG. 5. In an exemplary embodiment, at least one end gear 70 located at the end of each contactor 12 meshes with teeth 72 of a tooth plate 74 secured relative to the housing 14. The engagement between the end gears 70 and the tooth plate 74 further facilitates controlled movement of the contactors 12 relative to the cantilevered beam 20. This results in coordinated movement of the contactor 12 to equalize the stiffness of the connection between the flexure plate 18 and the housing 14 across all of the contactor 12/beam 20 pairs.

Referring to FIGS. 2-4, in a minimum stiffness configuration, e.g., as exemplarily depicted in FIG. 4, the contactor angles $\Theta_S$ relative to a reference position directed at the center point 64 of the housing 14/flexure plate 18, are minimized. Exemplarily the contactor angles $\Theta_S$ are 0°, meaning that center lines 30 of the contactors 12 are directed at the center point 64. In this orientation, a cross section of the cantilevered beam 20 taken along the line of the center line 30 of a contactor 12 is minimized to an effective minimum of the system.

When the drive motor 22 applies a torque to the flexure plate 18 through the connection of the shaft 60, the constraining forces on the cantilevered beam 20 are minimized because rotation about the VSA axis 64 is not constrained by the contactors 12 in this configuration. As a result, the cantilevered beam 20 experiences very little deflection despite the beam having very low stiffness. Torque cannot be transferred through the VSA with the contactors in this configuration.

As the contactors 12 are rotated about the respective rotation axes 22 to increase the angle $\Theta_S$, the stiffness of the VSA increases. One reason the stiffness increases is because the cross-sectional area of the cantilever beam 20 increases. Another reason the stiffness increases is because the contactors now directly oppose the motion of the flexure at the point of contact between the cantilever beam 20 and the contactor 12. This also increases the torque that is transferred between the flexure plate 18 and the housing 14 and increases the efficiency of power transfer in the VSA 10 as well as the precision of positioning of the output arm 56 in response to the drive motor 22. As the angle $\Theta_S$ increases, the contact point between each contactor 12 and the respective cantilevered beam 20 rotationally moves towards the periphery of the flexure plate 18. As the angle $\Theta_S$ increases, a cross section of the cantilevered beam 20 taken along the contactor center line 30 increases as well. These two corresponding changes in response to the increase in angle $\Theta_S$ increase the stiffness of the VSA 10 and the transfer of torque from the flexure plate 18 to the housing 14. FIG. 3 exemplarily depicts the contactors 12 in a position for maximum stiffness with the contactor center lines 30 directed as far away from the center point 64 (maximizing $\Theta_S$) within the system and the contact points between the contactors 12 and the cantilevered beams 20 maximally close, within the system, to the periphery of the flexure plate 18.

Exemplary embodiments of the flexure design exhibit a variable stiffness that exemplarily may span four orders of magnitude. This is exemplarily represented in the graph presented at FIG. 7. The graph of FIG. 7 exemplarily presents log joint stiffness as a function of normalized contactor position $\Theta_S$. An exponential relationship exists between contactor position and joint stiffness when the contactor 12 maintains contact with the cantilever beam 20. When maintaining contact with the cantilever beam, in a specific embodiment, the VSA stiffness can be set to be more stiff that the robot links or be set to have essentially zero stiffness (with infinitesimal motion) or very small stiffness (illustrated in FIG. 7) for finite link deflection. The VSA can also be set to have zero stiffness with finite motion when the contactor is rotated to break contact with the cantilever beam 20 (when a negative value of $\Theta_S$ is selected).

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description certain terms have been used for brevity, clarity, and understanding. No unnecessary limitations are to be inferred therefrom beyond the requirement of the prior art because such terms are used for descriptive purposes and are intended to be broadly construed. The different articles of manufacture and methods described herein above may be used in alone or in combination with other articles of manufacture and methods.

The invention claimed is:

1. A variable stiffness actuator, comprising:
   a flexure plate comprising a first cantilevered beam extending inwards from an outer periphery of the flexure plate;
   a housing, the housing and the flexure plate rotatable about a common joint axis; and
   a first contactor pivotably secured at a first revolute joint to the housing, the first contactor rotates about the revolute joint at a first rotation axis, the first rotation axis offset on the housing from the joint axis;
   wherein the first contactor engages the first cantilevered beam at a variable angle about the first rotation axis to adjust a stiffness of a mechanical connection between the flexure plate and the housing; and
   wherein the flexure plate comprises an outer ring that defines the outer periphery of the flexure plate, the outer ring coaxial about the common joint axis, and the first cantilevered beam extends inwardly from the outer ring towards the common joint axis.

2. The variable stiffness actuator of claim 1, further comprising a hollow shaft secured to the outer ring of the flexure plate.

3. The variable stiffness actuator of claim 2, further comprising a motor operably connected to the hollow shaft.

4. The variable stiffness actuator of claim 1, further comprising an output link secured to the housing.

5. The variable stiffness actuator of claim 1, further comprising:
   a pair of contactors comprising the first contactor and a second contactor pivotably secured at a second revolute joint to the housing, the second contactor rotates about the second revolute joint at a second rotation axis, the second rotation axis offset on the housing from the joint axis; and
   a pair of cantilevered beams comprising the first cantilevered beam and a second cantilevered beam extending inwards from the outer periphery of the flexure plate.

6. The variable stiffness actuator of claim 5, further comprising a contactor motor operably connected to the pair of contactors to simultaneously drive the first contactor to a first angle about the first rotation axis and the second contactor to a second angle about the second rotation axis wherein the first angle matches the second angle.

7. The variable stiffness actuator of claim 5 wherein the first cantilevered beam comprises a first engagement surface configured to be engaged by the first contactor and the first engagement surface located at a radial distance from the first rotation axis, and the second cantilevered beam comprises a second engagement surface configured to be engaged by the second contactor and the second engagement surface is located at the radial distance from the second rotation axis.

8. The variable stiffness actuator of claim 7, wherein each cantilevered beam of the pair of cantilevered beams is nonlinear in shape such that each cantilevered beam increases in cross-sectional thickness moving from a tip of each cantilevered beam towards an outer periphery of the flexure plate.

9. The variable stiffness actuator of claim 1, further comprising:
   a second cantilevered beam extending inwards from the outer periphery of the flexure plate;
   a second contactor pivotably secured at second revolute joint to the housing, the second contactor rotates about the second revolute joint at a second rotation axis, the second rotation axis offset on the housing from the joint axis;
   a third cantilevered beam extending inwards from the outer periphery of the flexure plate;
   a third contactor pivotably secured at third revolute joint to the housing, the third contactor rotates about the third revolute joint at a third rotation axis, the third rotation axis offset on the housing from the joint axis;
   a fourth cantilevered beam extending inwards from the outer periphery of the flexure plate; and
   a fourth contactor pivotably secured at fourth revolute joint to the housing, the fourth contactor rotates about the fourth revolute joint at a fourth rotation axis, the fourth rotation axis offset on the housing from the joint axis.

10. A robotic manipulator, comprising:
    a variable stiffness actuator comprising:
        a first flexure plate rotatable about a first common joint axis, the first flexure plate comprising an outer ring that defines an outer periphery of the flexure plate, the outer ring coaxial about the first common joint axis and a first cantilevered beam extending inwards from the outer ring towards the first common joint axis;
        a first housing rotatable about the first common joint axis; and
        a first contactor pivotably secured at a first revolute joint to the first housing, the first contactor rotates about the first revolute joint at a first rotation axis, the first rotation axis offset on the first housing from the first common joint axis, wherein the first contactor engages the first cantilevered beam at a variable angle about the first rotation axis to adjust a stiffness of a mechanical connection between the first flexure plate and the first housing;
    an input link operably connected to the first flexure plate;
    an output link secured to the first housing;
    a motor secured to the input link; and
    a hollow shaft rotatable by the motor, the hollow shaft secured to the outer ring of the first flexure plate.

11. The robotic manipulator of claim 10, wherein the variable stiffness actuator is a first variable stiffness actuator, and further comprising a second variable stiffness actuator, the second variable stiffness actuator comprising:
    a second flexure plate comprising a second cantilevered beam extending inwards from an outer periphery of the second flexure plate;
    a second housing, the second housing and the second flexure plate rotatable about a second common joint axis, wherein the input link is secured to the second variable stiffness actuator; and
    a second contactor pivotably secured at a second revolute joint to the second housing, the second contactor rotates about the second revolute joint at a second rotation axis, the second rotation axis offset on the second housing from the second common joint axis, wherein the second contactor engages the second cantilevered beam at a variable angle about the second rotation axis to adjust a stiffness of a mechanical connection between the second flexure plate and the second housing.

12. The robotic manipulator of claim 11, further comprising:
    a first contactor motor operably connected to the first contactor of the first variable stiffness actuator, the first contactor motor operable to change the variable angle of the first contactor to adjust the stiffness of the first variable stiffness actuator; and
    a second contactor motor operably connected to the second contactor of the second variable stiffness actuator, the second contactor motor operable to change the variable angle of the second contactor to adjust the stiffness of the second variable stiffness actuator.

13. The robotic manipulator of claim 12, wherein the first variable stiffness actuator is operated to a first stiffness and the second variable stiffness actuator is operated to a second stiffness.

14. A method of controlling stiffness in an actuator joint, the method comprising:
    providing an actuator joint comprising:
        a flexure plate comprising an outer ring that defines an outer periphery of the flexure plate, the outer ring coaxial about a common joint axis, a first cantilevered beam extending inwards from the outer ring towards the common joint axis;
        a housing, the housing and the flexure plate rotatable about a common joint axis; and
        a first contactor pivotably secured at a revolute joint to the housing, the first contactor rotates about the revolute joint at a first rotation axis, the first rotation axis offset on the housing from the common joint axis;

adjusting an engagement between the first contactor and the first cantilevered beam by adjusting a continuously variable angle of the first contactor about the first rotation axis;

engaging the first cantilevered beam with the first contactor at a first angle of the first contactor to provide a first stiffness mechanical connection between the flexure plate and the housing; and engaging the first cantilevered beam with the first contactor at a second angle of the first contactor to provide a second stiffness mechanical connection between the flexure plate and the housing;

providing an input torque on the flexure plate through a hollow shaft secured to the outer ring of the flexure plate; and transferring at least a portion of the input torque through the flexure plate to the housing through engagement between the first cantilevered beam and the first contactor.

15. The method of claim 14, wherein the input torque is a first input torque and further comprising:

providing the first stiffness mechanical connection between the flexure plate and the housing by engaging the first cantilevered beam with the first contactor at a first angle of the first contactor;

providing the first input torque to move the housing to a first angle;

after engaging the first cantilevered beam with the first contactor at the second angle of the first contactor to provide the second stiffness mechanical connection between the flexure plate and the housing, providing a second input torque on the flexure plate through the hollow shaft to move the housing to a second angle.

16. The method of claim 14, wherein the first angle is a minimum angle relative to the joint axis and the first stiffness is a minimal stiffness and the second angle is a maximum angle relative to the joint axis and the second stiffness is a maximal stiffness.

17. A variable stiffness actuator, comprising:

a flexure plate comprising a first cantilevered beam extending inwards from an outer periphery of the flexure plate;

a housing, the housing and the flexure plate rotatable about a common joint axis; and a first contactor pivotably secured at a first revolute joint to the housing, the first contactor rotates about the revolute joint at a first rotation axis, the first rotation axis offset on the housing from the joint axis, wherein the first contactor engages the first cantilevered beam at a variable angle about the first rotation axis to adjust a stiffness of a mechanical connection between the flexure plate and the housing;

a second cantilevered beam extending inwards from the outer periphery of the flexure plate;

a second contactor pivotably secured at second revolute joint to the housing, the second contactor rotates about the second revolute joint at a second rotation axis, the second rotation axis offset on the housing from the joint axis;

a third cantilevered beam extending inwards from the outer periphery of the flexure plate;

a third contactor pivotably secured at third revolute joint to the housing, the third contactor rotates about the third revolute joint at a third rotation axis, the third rotation axis offset on the housing from the joint axis;

a fourth cantilevered beam extending inwards from the outer periphery of the flexure plate; and a fourth contactor pivotably secured at fourth revolute joint to the housing, the fourth contactor rotates about the fourth revolute joint at a fourth rotation axis, the fourth rotation axis offset on the housing from the joint axis.

18. The variable stiffness actuator of claim 17, further comprising an output link secured to the housing.

19. A method of controlling stiffness in an actuator joint, the method comprising:

providing an actuator joint comprising:

a flexure plate comprising: a first cantilevered beam extending inwards from an outer periphery of the flexure plate, a second cantilevered beam extending inwards from the outer periphery of the flexure plate, a third cantilevered beam extending inwards from the outer periphery of the flexure plate, and a fourth cantilevered beam extending inwards from the outer periphery of the flexure plate;

a housing, the housing and the flexure plate rotatable about a common joint axis;

a first contactor pivotably secured at a revolute joint to the housing, the first contactor rotates about the revolute joint at a first rotation axis, the first rotation axis offset on the housing from the common joint axis;

a second contactor pivotably secured at second revolute joint to the housing, the second contactor rotates about the second revolute joint at a second rotation axis, the second rotation axis offset on the housing from the joint axis;

a third contactor pivotably secured at third revolute joint to the housing, the third contactor rotates about the third revolute joint at a third rotation axis, the third rotation axis offset on the housing from the joint axis; and a fourth contactor pivotably secured at fourth revolute joint to the housing, the fourth contactor rotates about the fourth revolute joint at a fourth rotation axis, the fourth rotation axis offset on the housing from the joint axis;

adjusting an engagement between the first contactor and the first cantilevered beam by adjusting a continuously variable angle of the first contactor about the first rotation axis;

engaging the first cantilevered beam with the first contactor at a first angle of the first contactor to provide a first stiffness mechanical connection between the flexure plate and the housing; and engaging the first cantilevered beam with the first contactor at a second angle of the first contactor to provide a second stiffness mechanical connection between the flexure plate and the housing; and simultaneously driving the first, second, third, and fourth to matching angles about the respective first, second, third, and fourth rotation axes.

20. The method of claim 19, wherein the first angle is a minimum angle relative to the joint axis and the first stiffness is a minimal stiffness and the second angle is a maximum angle relative to the joint axis and the second stiffness is a maximal stiffness.

* * * * *